(12) United States Patent
Smith et al.

(10) Patent No.: US 7,710,443 B2
(45) Date of Patent: May 4, 2010

(54) PROVIDING DATA

(75) Inventors: Kenneth K. Smith, Boise, ID (US);
Eugene A. Roylance, Boise, ID (US);
Kenneth E. Major, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 500 days.

(21) Appl. No.: 11/680,214

(22) Filed: Feb. 28, 2007

(65) Prior Publication Data
US 2008/0204886 A1 Aug. 28, 2008

(51) Int. Cl.
*B41J 2/435* (2006.01)
(52) U.S. Cl. .................. 347/237
(58) Field of Classification Search .......... 347/233, 347/237
See application file for complete search history.

(56) References Cited

U.S. PATENT DOCUMENTS

| | | | |
|---|---|---|---|
| 4,965,748 A | 10/1990 | Chang et al. | |
| 5,239,313 A | 8/1993 | Marko et al. | |
| 5,331,341 A | 7/1994 | Egawa et al. | |
| 6,191,866 B1 | 2/2001 | Kim | |
| 6,211,967 B1 | 4/2001 | Namizuka | |
| 6,504,147 B1 | 1/2003 | Ito et al. | |
| 2005/0157155 A1 | 7/2005 | Vazan | |
| 2006/0017798 A1 | 1/2006 | Lee | |
| 2006/0103712 A1 | 5/2006 | Motoyama | |
| 2006/0132587 A1 | 6/2006 | Keithley | |
| 2006/0203262 A1 | 9/2006 | Ishikawa et al. | |
| 2006/0203263 A1 | 9/2006 | Komiya et al. | |
| 2006/0244979 A1 | 11/2006 | Yazdy et al. | |

FOREIGN PATENT DOCUMENTS

EP    831392 A1    3/1998

*Primary Examiner*—Huan H Tran (57) ABSTRACT

A method comprising storing a first line of data that is received from processing circuitry across a first set of conductors prior to receiving a first signal from a laser engine having a plurality of laser units and providing the first line of data and a second line of data that is received from the processing circuitry across the first set of conductors to the laser engine in response to receiving the first signal is provided.

20 Claims, 4 Drawing Sheets

PROVIDING DATA

BACKGROUND

Image forming devices, such as laser printers, are often designed with components that form a compromise between performance and cost. Generally speaking, higher component costs provide increased performance and lower component costs provide decreased performance in an image forming device.

DETAILED DESCRIPTION

In the following detailed description, reference is made to the accompanying drawings, which form a part hereof, and in which is shown by way of illustration specific embodiments in which the disclosed subject matter may be practiced. It is to be understood that other embodiments may be utilized and structural or logical changes may be made without departing from the scope of the present disclosure. The following detailed description, therefore, is not to be taken in a limiting sense, and the scope of the present disclosure is defined by the appended claims.

According to one embodiment, an image forming device with a dual beam laser engine, conversion circuitry, and single beam image processing circuitry is provided. The single beam image processing circuitry is configured to output one line of image data at a time across a set of conductors. To allow the single beam processing circuitry to operate with a dual beam laser engine, conversion circuitry buffers alternate lines of image data from the processing circuitry and, for each buffered line, causes a buffered line and a subsequent line of image data from the processing circuitry to be provided to the dual beam laser engine in response to signal from the laser engine. The dual beam laser engine includes at least two laser units that are configured to form consecutive lines of a latent image on a drum in accordance with the lines of image data received from the conversion circuitry. The dual beam laser engine applies toner to the latent image and transfers the image from the drum to a medium.

Figure 1:
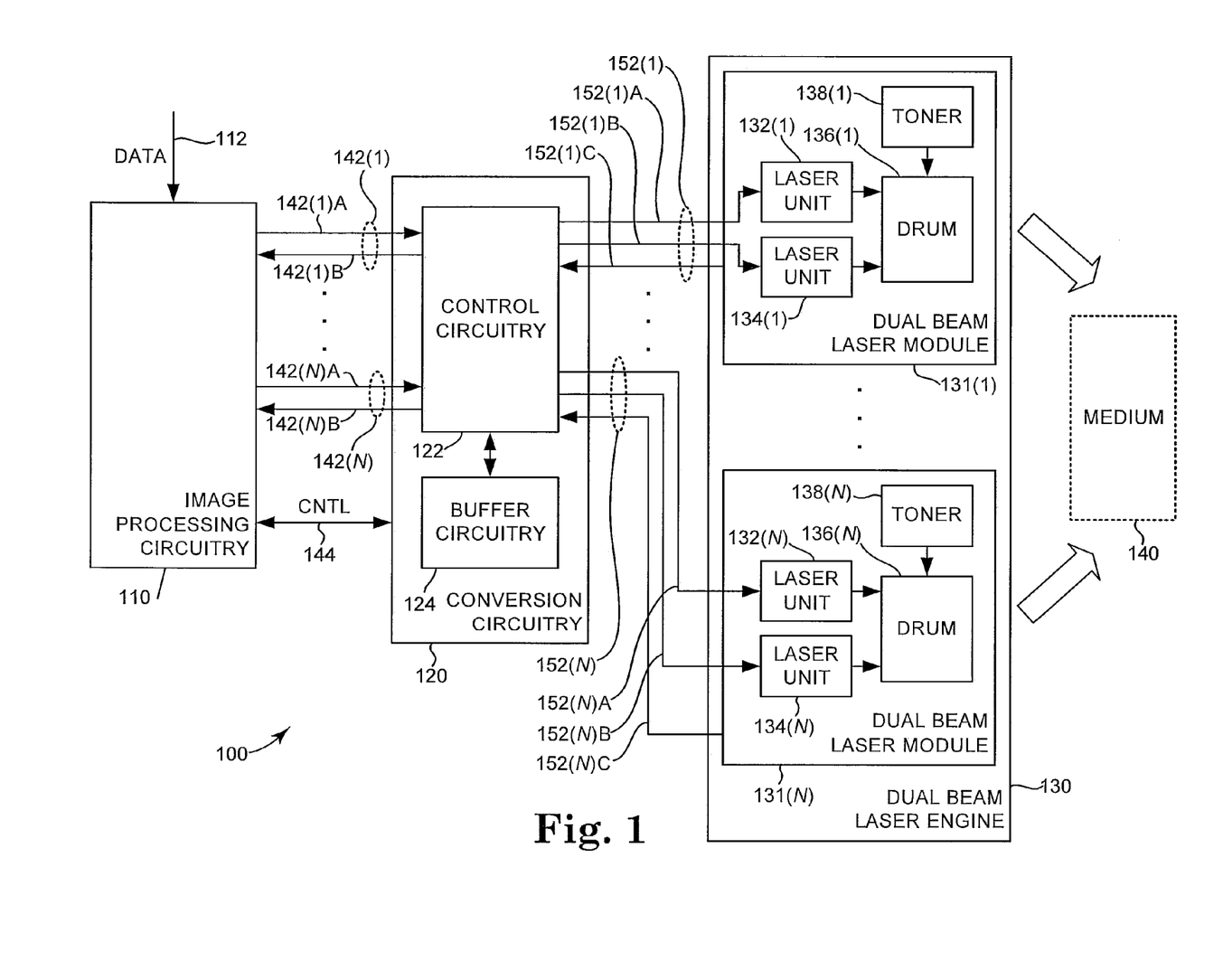
FIG. 1 is a block diagram illustrating one embodiment of an image forming device.

FIG. 1 is a block diagram illustrating one embodiment of an image forming device 100. Image forming device 100 includes single beam image processing circuitry 110, conversion circuitry 120, and a dual beam laser engine 130.

Dual beam laser engine 130 includes one or more dual beam laser modules 131(1)-131(N) where N is an integer greater than or equal to one and represents the Nth dual beam laser module 131. Each dual beam laser module 131 includes two laser units 132 and 134, a drum 136, and toner 138. In one embodiment, each dual beam laser module 131 includes a different color toner 138. For example, in an embodiment with four dual beam laser modules 131, toners 138(1)-138(4) may be cyan, magenta, yellow, and black, respectively, and may be used by image forming device 100 to form full color images on medium 140. In another embodiment, dual beam laser engine 130 includes a single dual beam laser module 131 with black or another color toner 138 and forms monochromatic images on medium 140. In further embodiments, toners 138(1)-(N) may include any other suitable color combination.

Image forming device 100 is configured to form images (not shown) on a medium 140 in accordance with image data received from a host device (not shown) across a wired or wireless connection 112. Image processing circuitry 110 receives the image data from the host device across connection 112, processes the image data to form a set of lines of image data for each dual beam laser module 131, and separately outputs each set of lines of image data to conversion circuitry 120.

The host device that provides image data to image forming device 100 may be any suitable information processing or storage system such as a personal or server computer, a print server, a database, a personal digital assistant (PDA), a mobile telephone, and an audio and/or video (AV) device. Host device may be directly or indirectly coupled to image forming device 100 by connection 112. Accordingly, connection 112 may represent a direct wired or wireless connection between the host device and image forming device 100 or a remote wired or wireless connection with any number of intermediate devices connected between the host device and image forming device 100.

Medium 140 may be any suitable surface such as paper for receiving an image or images formed by image forming device 100.

Image processing circuitry 110 communicates with conversion circuitry 120 using a set of conductors 142 for each dual beam laser module 131. Image processing circuitry 110 also communicates with conversion circuitry 120 using control signals 144.

Each set of conductors 142(1)-142(N) includes a set of one or more conductors 142(1)A-142(N)A that are configured to transmit lines of image data from processing circuitry 110 to conversion circuitry 120. In one embodiment, each set of conductors 142(1)A-142(N)A includes a single conductor configured to serially transmit the lines of image data. In other embodiments, each set of conductors 142(1)A-142(N)A includes two or more conductors that are configured to transmit the lines of image data serially or in parallel. Each set of conductors 142(1)-142(N) also includes at least one respective conductor 142(1)B-142(N)B that is configured to provide a beam detect (i.e., BD) or other suitable signal that is configured to cause image processing circuitry 110 to output a line of image data to conversion circuitry 120.

Control signals 144 include any number of conductors that are configured to indicate a top of a page to be formed on medium 140 along with any other suitable control signals. In one embodiment, control signals 144 form a Serial Peripheral Interface (SPI) between image processing circuitry 110 and conversion circuitry 120.

To form an image on medium 140, image processing circuitry 110 outputs a set of lines of image data to conversion circuitry 120 on a respective set of conductors 142(1)A-142(N)A for each dual beam laser module 131(1)-(N). For example, image processing circuitry 110 outputs the set of lines of image data for dual beam laser module 131(1) on conductors 142(1)A, outputs the set of lines of image data for dual beam laser module 131(2) on conductors 142(2), and so on. Because image processing circuitry 110 forms single beam image processing circuitry, image processing circuitry 110 is configured to output a single line of image data at a time for each dual beam laser module 131. Image processing circuitry 110 provides the sets of lines of image data to conversion circuitry 120 on conductors 142(1)A-142(N)A using any suitable signaling convention, such as a pulse-width modulated signal.

Image processing circuitry 110 may perform color conversion, half-toning, trapping, or other suitable image processing algorithms on received image data prior to providing lines of image data to conversion circuitry 120. In one embodiment, image processing circuitry 110 receives image data in RGB (i.e., red, green, and blue) format and performs color space conversion from RGB to CMYK (i.e., cyan, magenta, yellow, and black) prior to outputting lines of image data on conductors 142. In this embodiment, image processing circuitry 110 also performs half-toning and trapping algorithms on the CMYK image data prior to providing lines of image data to conversion circuitry 120.

To allow single beam image processing circuitry 110 to operate with dual beam laser engine 130, conversion circuitry 120 buffers alternate lines of image data for each dual beam laser module 131 and causes each buffered line of image data to be provided along with a subsequent line of image data to a respective dual beam laser module 131 substantially simultaneously. Within conversion circuitry 120, control circuitry 122 stores the alternate lines of image data in buffer circuitry 124. Control circuitry 122 may do so by extracting digital data from the alternate lines of image data, by sampling a pulse-width modulated signal that includes the alternate lines of image data to form digital data at a sufficient rate to ensure an adequate reproduction of the signal, or by using any other suitable data detection algorithm. Control circuitry 122 causes the digital data to be stored in buffer circuitry 124. Control circuitry 122 may convert the digital data to any suitable signaling convention, e.g., a pulse-width modulated signal, in response to reading out the digital data from buffer circuitry 124 in order to provide the buffered lines of image data to dual beam laser engine 130.

Conversion circuitry 120 communicates with dual beam laser engine 130 using a set of conductors 152 for each dual beam laser module 131. Each set of conductors 152(1)-152(N) includes two sets of conductors 152(1)A-152(N)A and 152(1)B-152(N)B that are each configured to transmit alternate lines of image data to a respective dual beam laser module 131(1)-131(N). In one embodiment, each set of conductors 152(1)A-152(N)A includes a single conductor configured to serially transmit lines of image data, and each set of conductors 152(1)B-152(N)B includes a single conductor configured to serially transmit lines of image data. In other embodiments, each set of conductors 152(1)A-152(N)A and each set of conductors 152(1)B-152(N)B include two or more conductors that are configured to transmit lines of image data serially or in parallel.

Each set of conductors 152(1)-152(N) also includes at least one conductor 152(1)C-152(N)C that is configured to provide a beam detect (i.e., BD) or other suitable signal that is configured to cause conversion circuitry 120 to output consecutive lines of image data to a respective dual beam laser module 131(1)-131(N) using respective sets of conductors 152(1)A-152(N)A and 152(1)B-152(N)B. Conversion circuitry 120 may also communicate with dual beam laser engine 130 using additional control signals (not shown) that indicate a top of a page to be formed on medium 140 along with any other suitable control signals.

Each dual beam laser modules 131 includes two laser units 132 and 134 connected to respective sets of conductors 152A and 152B, a drum 136, and a toner unit 138. Within each dual beam laser module 131, laser units 132 and 134 are configured to simultaneously form consecutive lines of a latent image on a drum 136 in accordance with the simultaneously received lines of image data.

Figure 2:
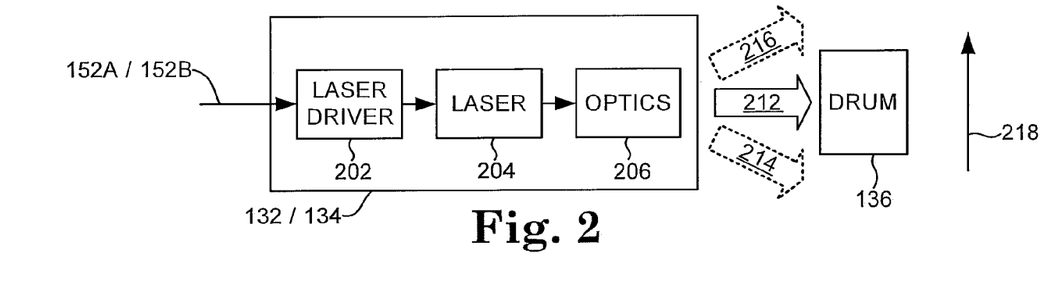
FIG. 2 is a block diagram illustrating one embodiment of the operation a laser unit.

FIG. 2 is a block diagram illustrating one embodiment of the operation of laser units 132 and 134. In the embodiment of FIG. 2, each laser unit 132 and 134 includes a laser driver 202, a laser 204, and optics 206. Laser driver 202 receives lines of image data from a set of conductors 152A or 152B. As optics 206 scan laser 204 across drum 136 as indicated by an arrow 218, laser driver 202 causes laser 204 to turn on and off to impinge selected locations on drum 136 according to the image data. In impinging selected locations on drum 136, laser 204 alters the charge at the selected locations to form the latent image (e.g., by charging or discharging selected locations on drum 136).

In one embodiment, optics 206 include a multi-faceted mirror (not shown) that is rotated by a motor (not shown). In this embodiment, each mirror facet scans laser 204 across drum 136 as the motor rotates the mirror. In other embodiments, optics 206 include other reflective or refractive elements configured to scan laser 204 across drum 136.

Laser units 132 and 134 operate with an active period and an inactive period. During the active period, laser units 132 and 134 form the latent image on drum 136. As optics 206 scan laser 204 across drum 136, optics 206 cause laser 204 to impinge on drum 136 during the active period as indicated by an arrow 212.

Prior to and subsequent to the active period (i.e., during the inactive period), optics 206 cause laser 204 to point away from drum 136 (i.e., not impinge on drum 136) as indicated by arrows 214 and 216 during the inactive period. As a result, laser units 132 and 134 do not generate the latent image on drum 136 during the inactive period.

Referring back to FIG. 1, toner unit 138 applies toner to the latent image on drum 136 and the image is transferred from drum 136 to a medium 140. Dual beam laser modules 131 may directly transfer images from drums 136(1)-136(N) to medium 140 in any suitable order or may indirectly transfer images from drums 136(1)-136(N) to an intermediate transfer unit (e.g., a belt) prior to transferring the images to medium 140.

Additional details of conversion circuitry 120 will now be described with reference to FIGS. 3-5.

Figure 3:
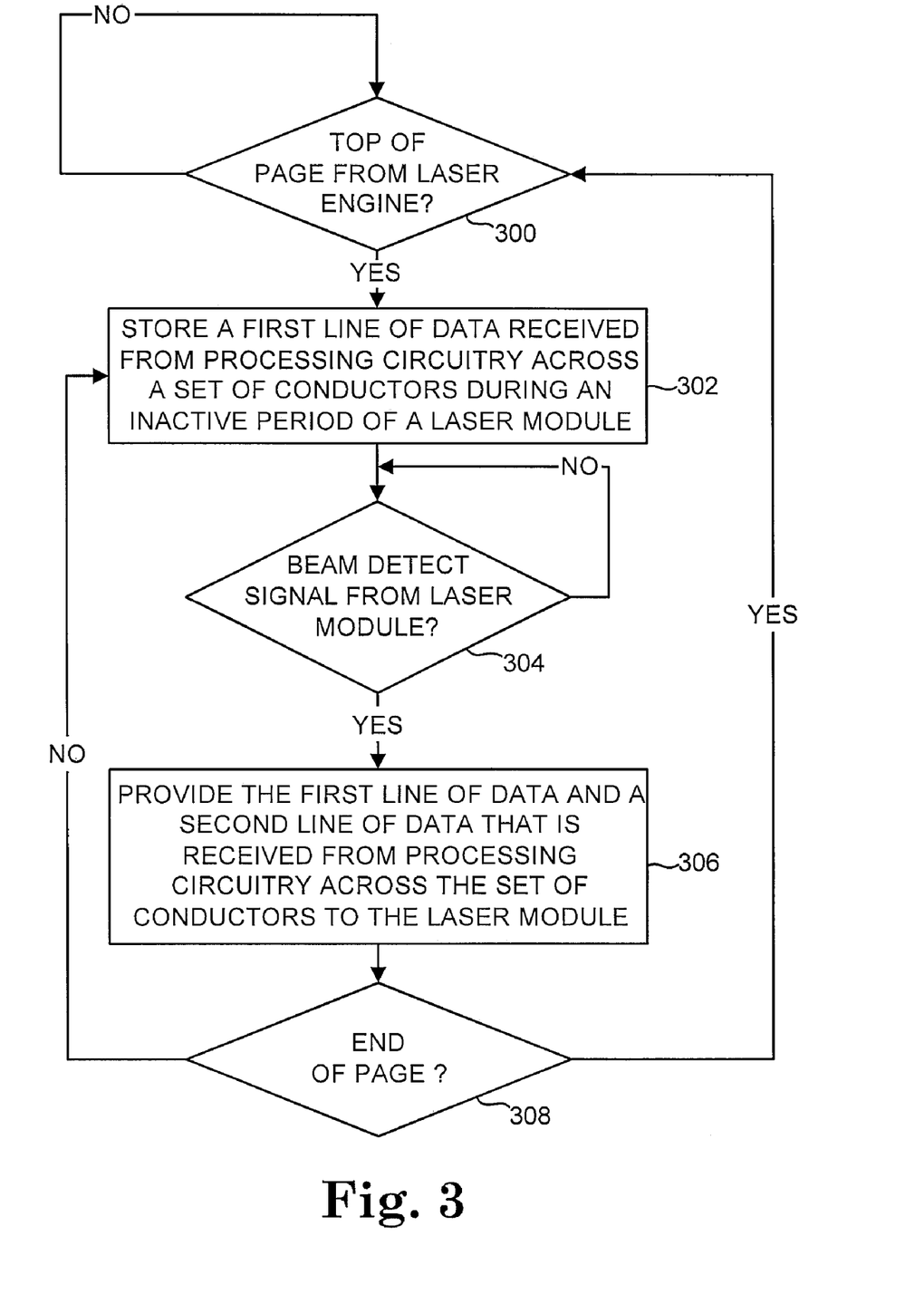
FIG. 3 is a flow chart illustrating one embodiment of a method performed by conversion circuitry.

FIG. 3 is a flow chart illustrating one embodiment of a method performed by conversion circuitry 120. The method of FIG. 3 will be described with reference to the embodiment of image forming device 100 shown in FIG. 1 and the signal diagram of FIG. 4 that illustrates one embodiment of the operation of image forming device 100. The method of FIG. 3 may be performed by conversion circuitry 120 for each page to be printed by image forming system 100 in one embodiment.

In FIG. 3, a determination is made by conversion circuitry 120 as to whether a top of page signal is received from dual beam laser engine 130 as indicated in a block 300. Conversion circuitry 120 repeats the function of block 300 until a top of page signal is received from dual beam laser engine 130.

In response to receiving a top of page signal from dual beam laser engine 130, conversion circuitry 120 performs the functions of blocks 302, 304, and 306 for each dual beam laser module 131 in parallel. The functions of blocks 302, 304, and 306 will now be described with reference to the interaction between processing circuitry 110, conversion circuitry, and dual beam laser module 131(1) by way of example.

Subsequent to receiving the top of page signal, conversion circuitry 120 stores a first line of image data received from processing circuitry 110 across a set of conductors 142(1)A during an inactive period of dual beam laser module 131(1) as indicated in a block 302. In response to the top of page signal, control circuitry 122 in conversion circuitry 120 generates a beam detect signal, nBD(1), at a time t1 as shown in FIG. 4 and provides the beam detect signal to processing circuitry 110 on conductor 142(1)B. In response to receiving the beam detect signal from conversion circuitry 120, processing circuitry 110 provides a first line of image data, VDO(1) (LINE 1), to conversion circuitry 120 on the set of conductors 142(1)A. Control circuitry 122 stores the first line of image data in buffer circuitry 124.

A determination is made by conversion circuitry 120 as to whether a beam detect signal, nENG_BD(1), is received from dual beam laser module 131(1) on conductor 152(1)C as indicated in a block 304. If a beam detect signal is not received from laser module 131(1), then conversion circuitry 120 waits until the beam detect signal is received from laser module 131(1).

The beam detect signal from laser module 131(1) indicates the end of the inactive period during which the function of block 302 was performed. In response to receiving the beam detect signal from laser module 131(1) on conductor 152(1)C, conversion circuitry 120 provides the first line of image data (LINE 1) and a second line of image data (LINE 2) that is received from processing circuitry 110 across the set of conductors 142(1)A to laser module 131(1) as indicated in a block 306. At time t2 in FIG. 4, conversion circuitry 120 receives beam detect signal, nENG_BD(1), from laser module 131(1) on conductor 152(1)C and provides the first line of image data (LINE 1) from buffer circuitry 124 to laser module 131(1) on the set of conductors 152(1)A (shown as signal ENG_VDO(1)A in FIG. 4). For the second line of image data (LINE 2), conversion circuitry 120 provides a second beam detect signal nBD(1) to processing circuitry 110. In response to the second beam detect signal, processing circuitry 110 provides the second line of image data (LINE 2) to conversion circuitry 120 on the set of conductors 142(1)A, and conversion circuitry 120 provides the second line of image data (LINE 2) from conductors 142(1)A to laser module 131(1) on the set of conductors 152(1)B (shown as signal ENG_VDO(1)B in FIG. 4). Conversion circuitry 120 does not store the second line of image data (LINE 2) from conductors 142(1)A in buffer circuitry 124 in one embodiment.

Figure 4:
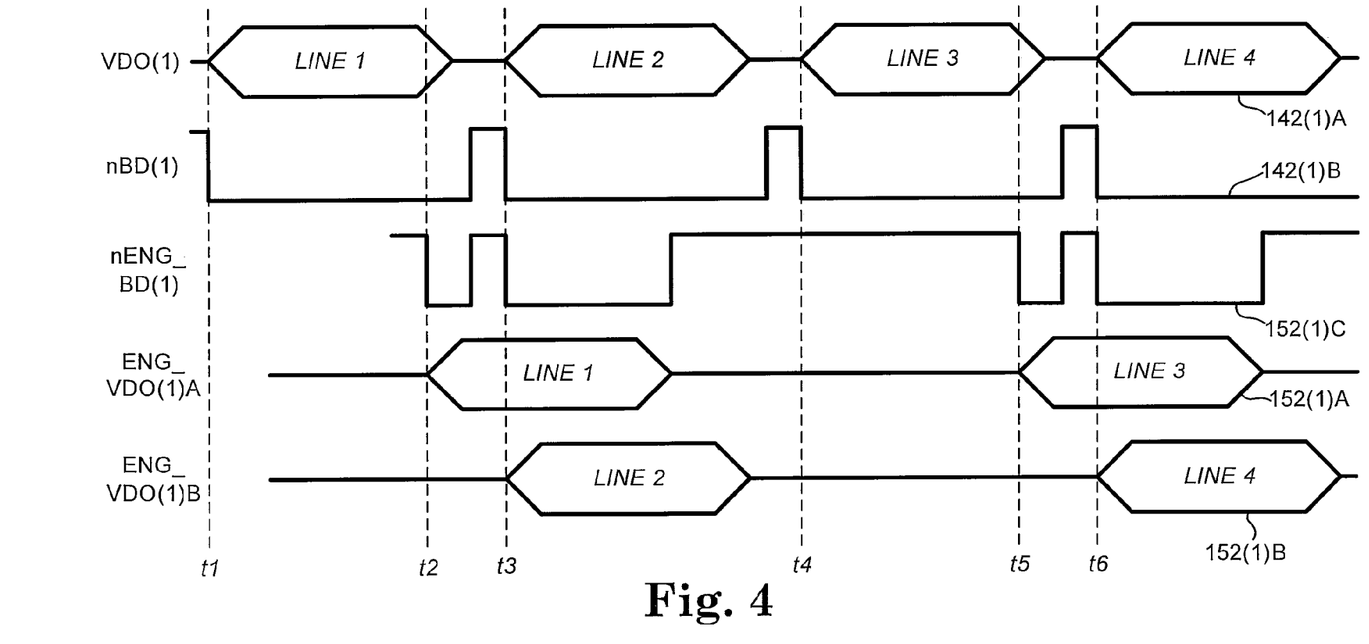
FIG. 4 is a signal diagram illustrating one embodiment of the operation of an image forming device.

In the example embodiment of FIG. 4, laser module 131(1) provides a second beam detect signal detect signal, nENG_BD(1), on conductor 152(1)C at a time t3 and conversion circuitry 120 provides this second beam detect signal from laser module 131(1) to processing circuitry 110 as the second beam detect signal nBD(1). In other embodiments, conversion circuitry 120 may generate the second beam detect signal nBD(1) at a set, predetermined time after the second beam detect signal detect signal nENG_BD(1) from laser module 131(1).

Conversion circuitry 120 provides the first and the second lines of image data (LINE 1 and LINE 2) to laser module 131(1) on conductors 152(1)A and 152(1)B, respectively, simultaneously or substantially simultaneously. As used herein, the term simultaneously means that conversion circuitry 120 provides at least a portion of each of the lines of image data to a laser module 131(1) at the same time. As shown in the example of FIG. 4, conversion circuitry 120 may simultaneously provide the first and the second lines of image data to laser module 131(1) by providing the first line starting at time t2 and the second line starting at time t3 (i.e., subsequent to time t2) such that the transmission of the first and the second lines partially overlap in time. In other embodiments, conversion circuitry 120 may fully synchronize or otherwise partially synchronize the transmission of the first and the second lines of image data to simultaneously provide the first and the second lines to laser module 131(1).

A determination is made by conversion circuitry 120 as to whether an end of the page is reached as indicated in a block 308. Conversion circuitry 120 may make this determination using pre-defined information (e.g., a set number of lines of image data per page) or a signal from dual beam laser engine 130. If an end of the page is not reached, conversion circuitry 120 repeats the functions of blocks 302, 304, and 306 for a next pair of lines of image data. For example, conversion circuitry 120 repeats the functions of blocks 302, 304, and 306 for third and fourth lines of image data (LINE 3 and LINE 4) as shown in FIG. 4. Notably, conversion circuitry 120 stores the third line of image data in buffer circuitry 124 at a time t4 which occurs in an inactive period of laser module 131(1) that is subsequent to the active period during which laser units 132(1) and 134(1) form lines corresponding to the first and the second lines of image data on drum 136(1). If an end of the page is reached, conversion circuitry 120 returns to repeat the function of block 300.

Figure 5:
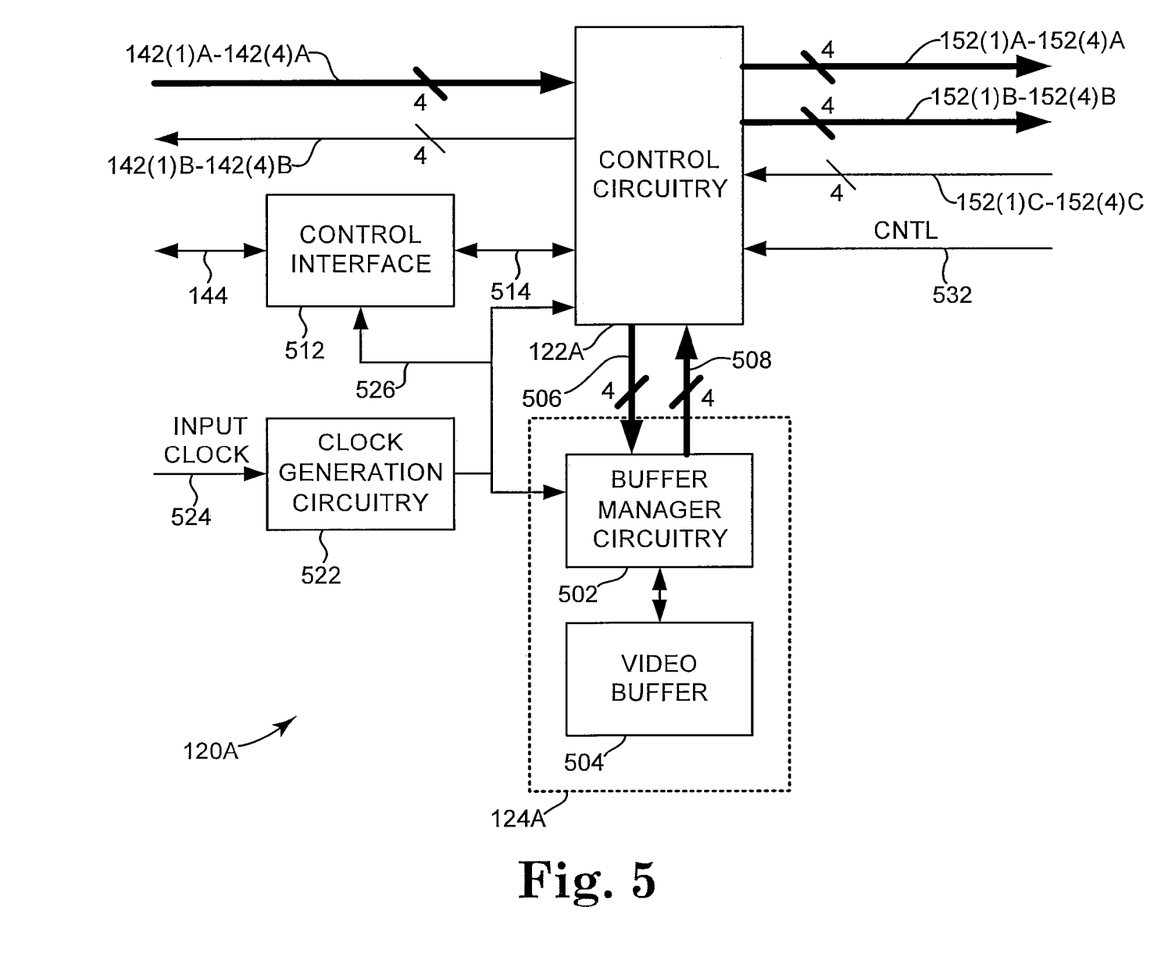
FIG. 5 is a block diagram illustrating one embodiment of conversion circuitry.

FIG. 5 is a block diagram illustrating an embodiment 120A of conversion circuitry 120. Conversion circuitry 120A includes an embodiment 122A of control circuitry 122, an embodiment 124A of buffer circuitry 124 with buffer management circuitry 502 and video buffer circuitry 504, control interface 512, and clock generation circuitry 522.

Conversion circuitry 120A is configured to operate with single beam image processing circuitry 110 and four dual beam laser modules 131(1)-131(4). Laser beam modules 131(1)-131(4) may include cyan, magenta, yellow, and black toner 138(1)-138(4), respectively, in one embodiment.

Conversion circuitry 120A includes four sets of conductors 142(1)A-142(4)A for receiving four sets of lines of image data from processing circuitry 110 in response to providing beam detect signals on corresponding conductors 142(1)B-142(4)B as described above with reference to FIGS. 3 and 4. Control circuitry 122A provides alternate lines of image data from each sets of conductors 142(1)A-142(4)A to buffer management circuitry 502 using four respective buses 506. Buffer management circuitry 502 stores the lines of image data in video buffer 504. Video buffer 504 includes any type of volatile or non-volatile storage device such as SRAM, DRAM, SDRAM, or DDR-SDRAM.

Control circuitry 122A receives beam detect signals on conductors 152(1)C-152(4)C from laser modules 131(1)-131(4), respectively, and simultaneously provides consecutive lines of image data to each laser module 131(1)-131(4) as described above with reference to FIGS. 3 and 4. In response to the beam detect signals, control circuitry 122A accesses the first line of image data for each laser module 131(1)-131(4) from buffer circuitry 124A. Buffer management circuitry 502 reads the first lines from video buffer 504 and provides the first lines to control circuitry 122A on a set of four busses 508. Control circuitry 122A provides the first lines to laser modules 131(1)-131(4) on sets of conductors 152(1)A-152(4)A. Control circuitry 122A accesses the second line of image data for each laser module 131(1)-131(4) from processing circuitry 110 by providing beam detect signals on conductors 142(1)B-142(4)B and receiving the second lines on sets of conductors 142(1)A-142(4)A. Control circuitry 122A provides the second lines of image data from sets of conductors 142(1)A-142(4)A to sets of conductors 152(1)B-152(4)B, respectively, simultaneously with providing the first lines of image data.

Control interface 512 couples to control lines 144 to provide control signals to and receive control signals from processing circuitry 110. The control signals include a top of page signal. Control interface 512 forms an SPI interface in one embodiment.

Clock generation circuitry 522 receives an input clock signal 524 at an input clock frequency (e.g., 100 MHz). Input clock signal 524 may be generated anywhere within or otherwise provided to image forming device 100. Clock generation circuitry 522 multiplies input clock signal 524 by any suitable clock multiple to generate an output clock signal 526 at an output clock frequency (e.g., 513 MHz). Clock generation circuitry 522 also includes a phase-locked loop (PLL), a delay-locked loop (DLL), or other suitable clock synchronization circuitry to cause clock signal 526 to be synchronously provided to control circuitry 122A, buffer circuitry 124A, and control interface 512.

Dual beam laser engine 130 provides any suitable control signals, such as a top of page signal, to control circuitry 122A using control signals (CNTL) 532.

Although specific embodiments have been illustrated and described herein for purposes of description of the embodiments, it will be appreciated by those of ordinary skill in the art that a wide variety of alternate and/or equivalent implementations may be substituted for the specific embodiments shown and described without departing from the scope of the present disclosure. Those with skill in the art will readily appreciate that the present disclosure may be implemented in a very wide variety of embodiments. This application is intended to cover any adaptations or variations of the disclosed embodiments discussed herein. Therefore, it is manifestly intended that the scope of the present disclosure be limited by the claims and the equivalents thereof.

What is claimed is:

1. A method comprising:
    storing a first line of data that is received from processing circuitry across a first set of conductors prior to receiving a first signal from a laser engine having a plurality of laser units; and
    providing the first line of data and a second line of data that is received from the processing circuitry across the first set of conductors to the laser engine in response to receiving the first signal.
2. The method of claim 1 further comprising:
    receiving the first line of data from the processing circuitry across the first set of conductors during a first inactive period of the laser engine.
3. The method of claim 2 further comprising:
    receiving the first signal from the laser engine subsequent to the first inactive period.
4. The method of claim 2 further comprising:
    providing a second signal associated with the first line of data to the processing circuitry during the first inactive period.
5. The method of claim 2 further comprising:
    storing a third line of data that is received from processing circuitry across the first set of conductors during a second inactive period that occurs subsequent to receiving the first signal.
6. The method of claim 1 further comprising:
    providing the first line of data to a first one of the plurality of laser units across a second set of conductors; and
    providing the second line of data to a second one of the plurality of laser units across a third set of conductors.
7. The method of claim 1 further comprising:
    providing the first and the second lines of data to the laser engine substantially simultaneously.
8. An apparatus comprising:
    control circuitry including a first set of conductors coupled to processing circuitry, a second set of conductors coupled to a first laser unit in a laser engine, and a third set of conductors coupled to a second laser unit in the laser engine; and
    buffer circuitry coupled to the control circuitry;
    wherein the control circuitry is configured to provide a first line of data received across the first set of conductors from the buffer circuitry to the first laser unit on the second set of conductors in response to receiving a first signal from the laser engine, and wherein the control circuitry is configured to provide a second line of data from the first set of conductors to the second laser unit on the third set of conductors in response to receiving the first signal.
9. The apparatus of claim 8 wherein the control circuitry is configured to provide a second signal to the processing circuitry to cause the first line of data to be provided on the first set of conductors prior to receiving the first signal.
10. The apparatus of claim 9 wherein the control circuitry is configured to store the first line of data in the buffer circuitry.
11. The apparatus of claim 9 wherein the control circuitry is configured to provide a third signal to the processing circuitry to cause the second line of data to be provided on the first set of conductors contemporaneous with receiving the first signal.
12. The apparatus of claim 8 wherein the control circuitry is configured to synchronously provide the first line of data to the first laser unit and the second line of data to the second laser unit.
13. The apparatus of claim 8 the control circuitry is configured to provide the second line of data on the third set of conductors without storing the second line of data in the buffer circuitry.
14. A system comprising:
    a laser engine including first and second laser units, first toner, and a first drum, the laser engine configured to generate a first signal;
    conversion circuitry configured to store a first line of data from a first set of conductors in buffer circuitry prior to receiving the first signal and configured to provide the first line of data from the buffer circuitry to the first laser unit and a second line of data from the first set of conductors to the second laser unit in response to receiving the first signal; and
    processing circuitry configured to provide the first and the second lines of data on the first set of conductors;
    wherein the first and second laser units and the first toner are configured to simultaneously form first and second lines of a first image, respectively, on the first drum in accordance with the first and the second lines of data, respectively.
15. The system of claim 14 wherein the laser engine is configured to apply the first image to a medium.
16. The system of claim 14 wherein the conversion circuitry is configured to provide a second signal to the processing circuitry prior to receiving the first signal, and wherein the processing circuitry is configured to provide the first line of data to the conversion circuitry in response to receiving the second signal.
17. The system of claim 16 wherein the conversion circuitry is configured to provide a third signal to the processing circuitry contemporaneous with receiving the first signal, and wherein the processing circuitry is configured to provide the second line of data to the conversion circuitry in response to receiving the third signal.

18. The system of claim 14 wherein the laser engine includes third and fourth laser units, second toner, and a second drum and configured to generate a second signal, wherein the conversion circuitry is configured to store a third line of data from a second set of conductors in buffer circuitry prior to receiving the second signal and configured to provide the third line of data from the buffer circuitry to the third laser unit and a fourth line of data from the second set of conductors to the fourth laser unit in response to receiving the second signal, wherein the processing circuitry is configured to provide the third and the fourth lines of data on the second set of conductors, and wherein the third and fourth laser units and the second toner are configured to simultaneously form first and second lines of a second image, respectively, on the second drum in accordance with the third and the fourth lines of data, respectively.

19. The system of claim 18 wherein the first toner is a first color and the second toner is a second color that differs from the first color.

20. The system of claim 19 wherein the first and the second laser engines are configured to apply the first and the second images, respectively, to a medium.

* * * * *

UNITED STATES PATENT AND TRADEMARK OFFICE
CERTIFICATE OF CORRECTION

PATENT NO. : 7,710,443 B2  Page 1 of 1
APPLICATION NO. : 11/680214
DATED : May 4, 2010
INVENTOR(S) : Kenneth K. Smith et al.

It is certified that error appears in the above-identified patent and that said Letters Patent is hereby corrected as shown below:

In column 8, line 34, in Claim 13, before "the" insert -- wherein --.

Signed and Sealed this

Nineteenth Day of October, 2010

David J. Kappos
*Director of the United States Patent and Trademark Office*